United States Patent
Mashimo

(10) Patent No.: US 8,550,029 B2
(45) Date of Patent: Oct. 8, 2013

(54) FLUID AGENT APPLYING MULTI-VENT NOZZLE

(75) Inventor: Kenji Mashimo, Kyoto (JP)

(73) Assignee: Suncall Corporation, Kyoto (JP)

( * ) Notice: Subject to any disclaimer, the term of this patent is extended or adjusted under 35 U.S.C. 154(b) by 242 days.

(21) Appl. No.: 13/026,358

(22) Filed: Feb. 14, 2011

(65) Prior Publication Data

US 2011/0253039 A1  Oct. 20, 2011

(30) Foreign Application Priority Data

Apr. 19, 2010  (JP) ................. 2010-096106

(51) Int. Cl.
*B05B 7/06* (2006.01)
*B05B 5/00* (2006.01)
*B05B 1/14* (2006.01)

(52) U.S. Cl.
USPC ........... 118/313; 118/315; 118/300; 239/555; 239/557

(58) Field of Classification Search
USPC ................. 118/300, 313–315; 239/518–524, 239/596–601, 554, 555, 557
See application file for complete search history.

(56) References Cited

U.S. PATENT DOCUMENTS

| | | | | |
|---|---|---|---|---|
| 4,097,243 A | * | 6/1978 | Bartholic | 422/140 |
| 5,474,235 A | * | 12/1995 | Cole et al. | 239/431 |
| 5,692,682 A | * | 12/1997 | Soule | 239/403 |
| 2008/0191056 A1 | * | 8/2008 | deLesdernier et al. | 239/403 |

FOREIGN PATENT DOCUMENTS

| | | |
|---|---|---|
| JP | 63-201678 | 12/1988 |
| JP | 11-300257 | 11/1999 |
| JP | 2011-083766 | 4/2011 |

OTHER PUBLICATIONS

Japanese Office Action issued Apr. 19, 2012 in corresponding Japanese Patent Application No. 2010-096106 with partial English translation.

* cited by examiner

*Primary Examiner* — Yewebdar Tadesse
(74) *Attorney, Agent, or Firm* — Wenderoth, Lind & Ponack, L.L.P.

(57) ABSTRACT

A fluid agent applying multi-vent nozzle is capable of densely disposing ejecting vents. The multi-vent nozzle has a main body configured in a casing block, a raised surface provided at a distal end of the casing block, contoured and dimensioned corresponding to a target area to apply fluid agent to, and a plurality of ejecting vents defined in the raised surface.

5 Claims, 12 Drawing Sheets

FLUID AGENT APPLYING MULTI-VENT NOZZLE

TECHNICAL FIELD

The present invention relates to a fluid agent applying multi-vent nozzle, and more particularly, to a multi-vent nozzle suitable for applying adhesive fluid agent to minute parts such as miniaturized components of a magnetic head suspension for a hard disk drive (HDD).

BACKGROUND ART

Magnetic head suspensions used for HDDs are typically comprised of a base plate attached to a supporting shaft such as a carriage arm, and a load beam extending outward from the base plate. The supporting shaft is controlled by an actuator with a voice coil motor (VCM), and this enables a magnetic head attached to a distal end of the load beam via a flexure to be controllably positioned in the seek direction. Some state-of-the-art hyper-storage density HDDs, in order to cope with uncontrollability in precisely positioning their magnetic heads merely with the aid of the aforementioned actuator driving the supporting shaft, employ a dual-stage actuating style where a micro-motion control actuator is added in position between the base plate and the load beam so as to force the load beam to pivot in the seek direction.

In general, an adhesive fluid agent is used to attach various components such as the micro-motion control actuator to the magnetic head suspension. The fluid agent is either electrically insulating or conducting and is usually discharged from a nozzle at the tip of a syringe loaded with the fluid agent and pneumatically pressurized (or mechanically pressurized by a piston or the like) so as to apply the fluid agent to the targeted area in a work piece. A typical one of such a nozzle includes the one as illustrated in FIG. 11A: a nozzle 10 has its upper end inlet 10a coupled with an outlet of the syringe that is held by a robot and moved along with the nozzle 10 toward the predetermined target area prior to discharging the fluid agent from a nozzle tip 10b to deposit a spot(s) of the fluid agent. Otherwise, as depicted in FIG. 11B, a line of the fluid agent may be drawn by the nozzle tip 10b moved by the robot.

The nozzle 10 in FIG. 11A is a single-vent nozzle with one ejection conduit provided in the nozzle tip 10b, and when the target area is in more than one location or when it occupies one large range, a multi-vent nozzle 20 as depicted in FIG. 12A may be substituted in order to save time spent for applying the fluid agent. The multi-vent nozzle 20 has its inlet unit 20a as an incoming fluid agent intake configured with a single channel and its casing block 20c as an outgoing fluid agent exit configured with multi channels divided from the single channel, and the fluid agent is discharged all at a time from cylindrical ejecting conduits 20b at distal ends of the channels. Such a multi-vent nozzle with ejecting conduits together formed in a single block is disclosed in FIG. 4 attached to Patent Document 1 (Official Gazette of Preliminary Publication of Unexamined Patent Application No. H11-300257).

CITATION LIST

Patent document 1: JP-A-11-300257

SUMMARY OF INVENTION

Technical Problem

If it is desired to spread only a minute amount of the fluid agent in a relatively large range with the multi-vent nozzle, the nozzle must have many vents at very small pitches. However, the cylindrical ejecting vents should have a critical thickness, and the current machining technology necessitates a critical interval between the vents adjacent to each other. Hence, in order to manufacture the multi-vent nozzle 20 as in FIG. 12A, the pitch between the ejecting vents cannot be indefinitely small. Thus, as can be seen in FIG. 12B, if an insufficient amount of the fluid agent 30 is applied, droplets of the fluid agent 30 stay like isolated islands; and meanwhile, as shown in FIG. 12C, if an excessive amount of the fluid agent 30 is applied, the ejected substance is heaped up too much, which is disadvantageous in that the fluid agent 30 is used more than actually needed, and the resultant bonding performance is degraded. An additional problem is that the ejecting vents are so fine and are prone to break or deform.

The present invention is made to overcome the aforementioned problems with the prior art, and it is an object of the present invention is to provide a multi-vent fluid agent applying nozzle with ejecting vents densely disposed.

Solution to Problem

In order to solve the aforementioned problems in the prior art, the present invention provides a fluid agent applying multi-vent nozzle comprising a raised surface that is provided at a distal end of a casing block, and shaped and dimensioned corresponding to a target area to which the fluid agent is applied to, and a plurality of ejecting vents defined in the raised surface for discharging the fluid agent.

The raised surface may be a belt-shaped raised surface, and elongate vents may be defined along the belt-shaped raised surface so as to discharge the fluid agent through the vents.

The raised surface may be a rectangular-ring-shaped raised surface, and elongate vents may be defined along the rectangular-ring-shaped raised surface so as to discharge the fluid agent through the vents, as well as one or more vents defined in the distal end of the casing block behind the rectangular-ring-shaped raised surface so as to discharge the fluid agent.

In another aspect of the present invention, a raised portion is provided at a distal end of a casing block, and contoured and dimensioned corresponding to edge portions of a hole or a notch that is a target area to apply fluid agent to. A plurality of vents may be defined along a proximal end of the raised portion so as to discharge the fluid agent. In this case, the plurality of the vents along the proximal end of the raised portion may be replaced with elongate vents to supply the fluid agent. In addition, an outer sidewall of the raised portion may have grooves in fluid communication with the plurality of the vents or the elongate vents and extending along a rising extension of the raised portion.

The present invention also provides a multi-vent nozzle comprising a raised portion provided at a distal end of a casing block, and contoured and dimensioned corresponding to edge portions of a hole or a notch that is defined in a base plate, an actuator device for controlling a load beam of a magnetic head suspension for supporting a magnetic head being fitted in the hole or the notch, and a plurality of vents or elongate vents defined along a proximal end of the raised portion so as to discharge fluid agent. An outer sidewall of the raised portion may have grooves in fluid communication with the plurality of the vents or the elongate vents and extending along a rising extension of the raised portion.

The present invention provides a fluid agent applying multi-vent nozzle for applying fluid agent to an assembly of a base plate and a load beam of a magnetic head suspension for supporting a magnetic head, the multi-vent nozzle comprises a main body configured in a casing block, a raised portion provided at a distal end of the casing block, contoured and dimensioned corresponding to edge portions of a hole or a notch defined in the base plate, an actuator device for controlling the load beam being fitted in the hole or the notch, a plurality of first vents or elongate vents defined along a proximal end of the raised portion for discharging fluid agent, and second vents defined at the distal end of the casing block for applying the fluid agent to the load beam.

An outer sidewall has grooves in fluid communication with the plurality of the vents or the elongate vents and extending along a rising extension of the raised portion.

In accordance with the present invention, since the raised surface is defined in the distal end of the casing block, and contoured and dimensioned corresponding to a target area to apply the fluid agent to, and the plurality of the ejecting vents are defined in the raised surface to discharge the fluid agent, unlike a prior art multi-vent nozzle with a plurality of cylindrical ejecting conduits disposed therein, there is no need to allow for a thickness of the ejecting conduits and a minimal interval between them, and reducing a diameter of the vents as much as possible brings about a fluid agent applying multi-vent nozzle with ejecting vents densely disposed. The multi-vent nozzle according to the present invention is advantageous because of its reduced fragileness of breaking and/or deforming, in contrast with the prior art multi-vent nozzles. Additionally, the raised surface provided with the ejecting vents defines an area where the fluid agent is to be applied, and hence, the fluid agent can be applied to a target in precise positions and range.

DESCRIPTION OF EMBODIMENTS

Embodiment 1

Figure 1A:
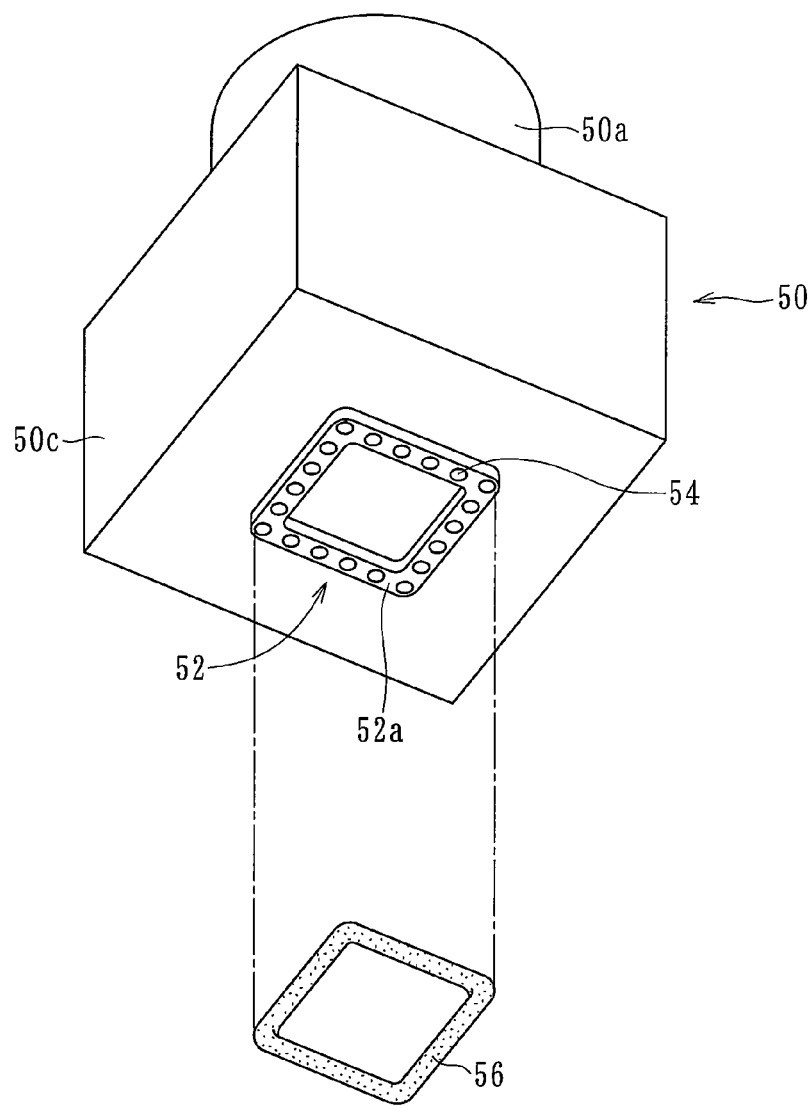
FIG. 1A is a perspective view illustrating a first embodiment of a multi-vent nozzle in accordance with the present invention.
Figure 1B:
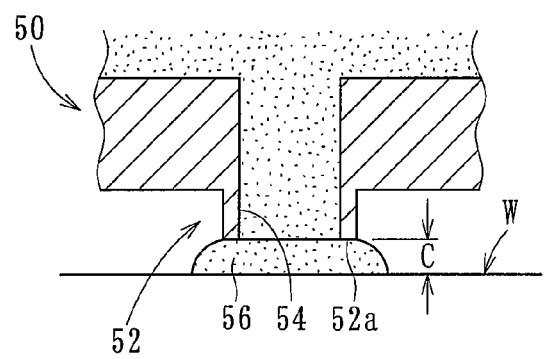
FIG. 1B is a partial sectional view illustrating the first embodiment of the multi-vent nozzle in accordance with the present invention.

The present invention will now be described in the context of four preferred embodiments with reference to the accompanying drawings. FIG. 1A depicts a first embodiment of a multi-vent nozzle 50, which has a hollow cubic casing block 50c. In the center of an upper side of the casing block 50c, a cylindrical inlet unit 50a is provided so as to be coupled with an ejecting outlet of a syringe (not shown). The inlet unit 50a is in fluid communication with a hollow space within the casing block 50c. In the center of a bottom side of the casing block 50c, a rectangular-ring-shaped raised portion 52 is formed. Dimensions and shape of the raised portion 52 are customized depending on the dimensions and shape of a target area in a work piece to apply the fluid agent to. The raised portion 52 has a rectangular end surface 52a in and along which, as shown in FIG. 1B, a plurality of ejecting vents 54 are equidistantly disposed so as to be in fluid communication with the hollow space within the casing block 50c.

The ejection vents 54 can be formed by any of the well-known machining arts such as drilling, electrical discharging, laser emission, and the like. The number and dimensions of the vents 54 are variable depending upon factors such as an amount of the fluid agent to apply. In the illustrated embodiment, there are six of the vents 54 in each side of the rectangular end surface of the raised portion. The vents 54 may have a diameter ranging from 0.03 to 0.1 mm. Although the prior art nozzle has its cylindrical multi vents downsized to its minimum limit of inner diameter as small as 0.15 mm, the present invention facilitates machining of the nozzle so as to have vents of 0.1 mm or even smaller in diameter.

The casing block 50c may be made of any material that is selected as the optimum depending upon a diameter of the machined nozzle vents and a type of the fluid agent to apply. Metals suitable include cemented carbide, dies steel, high-speed tool steel, stainless steel, copper, and the like. Non-metal materials such as ceramics and ruby may also be used. When the fluid agent is corrosive, stainless steel is suitable, and when heat transfer rate is of interest, copper is the appropriate one. If suppressing heat distortion or any other deformation is a matter of utmost concern, ruby is useful for that purpose, and in the event that heat resistance is a critical matter, ceramics may be the user's choice. For the purpose of enhancing rust-proof or anticorrosion property, or in order to improve non-cohesiveness, the casing block may be coated if desired. For instance, it may undergo DLC coating to decrease coefficient of friction or may be coated with fluorocarbon polymers to improve non-cohesiveness.

The multi-vent nozzle 50 in FIG. 1A is used in a manner described as follows. First, a syringe with an attachment of the multi-vent nozzle 50 is fixed to a robot arm. The robot arm is operated to move the multi-vent nozzle 50 to a proximal position to a work piece W onto which the fluid agent is to be applied, as shown in FIG. 1B. Then, the multi-vent nozzle 50 has its raised portion faced to the work piece W so that an end surface of the raised portion is in parallel to the target area in the work piece W with a predetermined clearance C therebetween. The clearance C depends upon an amount of the fluid agent to apply; that is, as the amount (a height of a deposit) is increased (greater in profile), the clearance C is to be wider while as the amount (the height of the deposit) is reduced (smaller in profile), the clearance C is to be narrower. A predetermined amount of the fluid agent ejected from each vent in this manner spreads uniformly in the clearance C, and the fluid agent discharged creates a rectangular ring 56 of a predetermined thickness.

Embodiment 2

Figure 2:
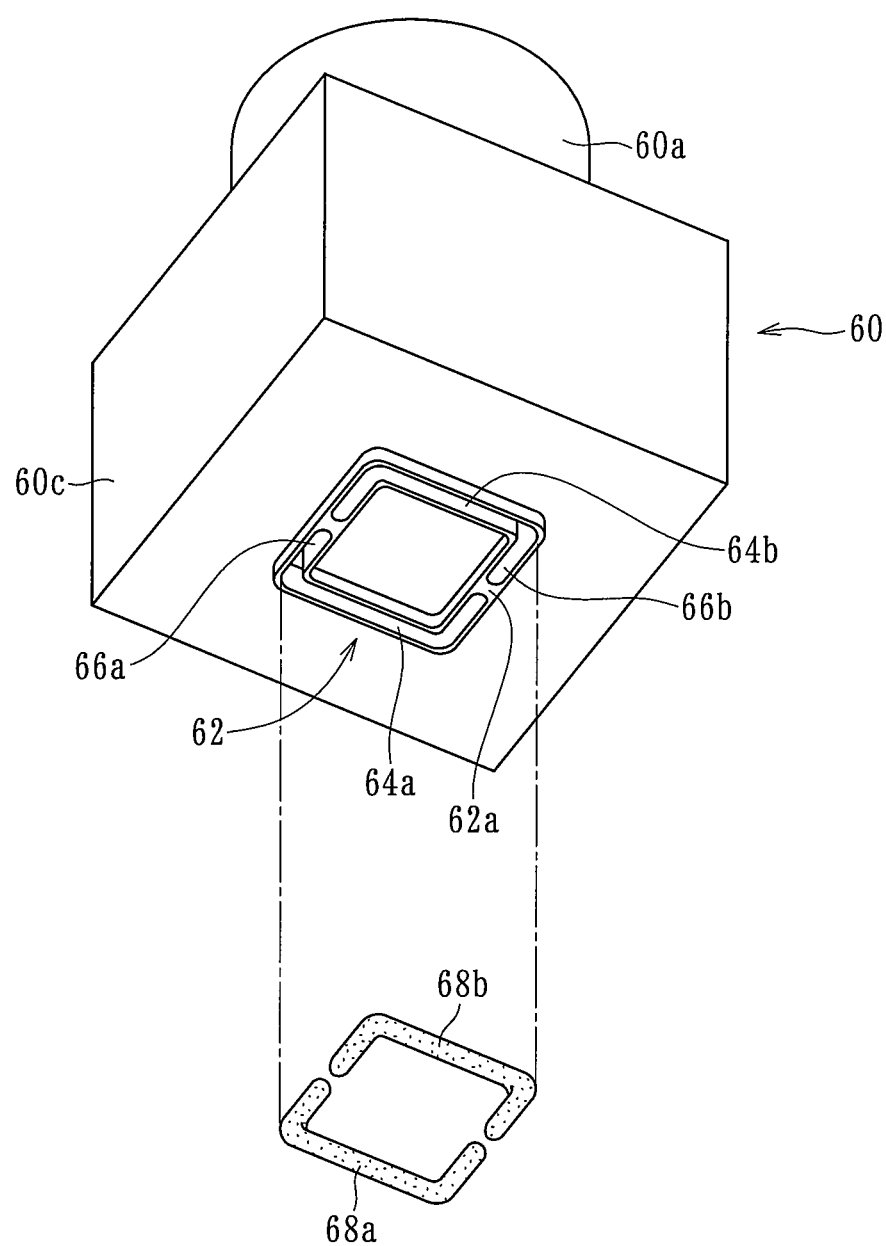
FIG. 2 is a perspective view illustrating a second embodiment of the multi-vent nozzle in accordance with the present invention.

FIG. 2 illustrates a second embodiment of the multi-vent nozzle denoted by reference numeral 60. A casing block 60c and an inlet unit 60a are configured relative to each other in the same manner as their counterparts are in FIG. 1. In the center of a lower side of the casing block 60c of the multi-vent nozzle 60, a rectangular-ring-shaped raised portion 62 is formed. Dimensions and shape of the raised portion 62 is customized depending upon the dimensions and shape of a target area in a work piece to apply the fluid agent to. A rectangular end surface 62a of the raised portion 62 is provided with a pair of elongate ejecting vents 64a and 64b. The elongate ejecting vents 64a and 64b have their respective one ends connected with communicating vessels 66a and 66b leading to a hollow space within the casing block 60c. The elongate ejecting vents 64a and 64b, and the communicating vessels 66a and 66b are formed by any of the well-known machining arts such as drilling, electrical discharging, laser emission, and the like. The elongated ejecting vents may have a width ranging from 0.03 to 0.1 mm.

The multi-vent nozzle 60 in FIG. 2 may be used in the same manner as depicted in FIG. 1. When a predetermined amount of the fluid agent is supplied through the communicating vessels 66a and 66b, the fluid agent thoroughly fills the elongate ejecting vents 64a and 64b and then pours out of the vents 64a and 64b down on the target area in the work piece till a predetermined height of a deposit stickily lies in shape of a pair of square brackets 68a and 68b. Although the prior art nozzles often encounter choking on the fluid agent containing electrically conductive micro-particles of substances such as silver, the elongate ejecting vents 64a and 64b eliminate the problem with applying such a suspension agent by the nozzle.

Embodiment 3

Figure 3:
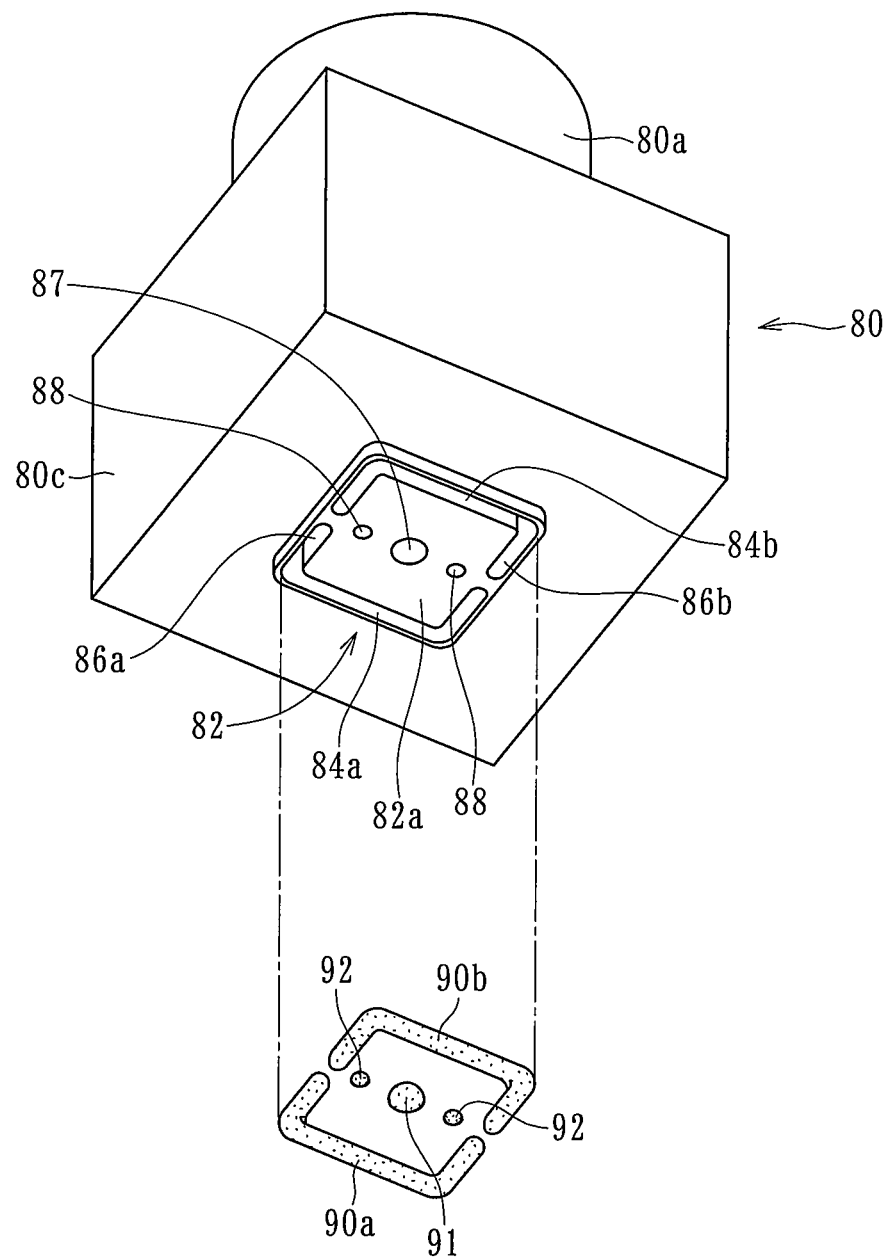
FIG. 3 is a perspective view illustrating a third embodiment of the multi-vent nozzle in accordance with the present invention.

FIG. 3 illustrates a third embodiment of the multi-vent nozzle denoted by a reference numeral 80. A casing block 80c and an inlet unit 80a are configured relative to each other in the same manner as their counterparts are in FIG. 1. In the center of a lower side of the casing block 80c of the multi-vent nozzle 80, a rectangular raised portion 82 is formed. In the periphery of a distal end surface 82a of the raised portion 82, a pair of elongate ejection vents 84a and 84b are defined in shape of square brackets and have their respective one ends connected with communicating vessels 86a and 86b as in FIG. 2. In the center of the distal end surface 82a, there is a relatively large first ejecting orifice 87 accompanied with relatively small second ejecting orifices 88 on the opposite sides. The ejecting orifices 87 and 88 are in fluid communication with a hollow space within the casing block 80c. The elongate ejecting vents 84a and 84b, the communicating vessels 86a and 86b, and the ejecting orifices 87 and 88 may be formed by any of the well-known machining arts such as drilling, electrical discharging, laser emission, and the like.

The elongate ejecting vents 84a and 84b, and the ejecting orifices 87 and 88 may have a width ranging from 0.03 to 0.1 mm.

The multi-vent nozzle 80 in FIG. 3 may be used in the same manner as depicted in FIG. 1. When a predetermined amount of the fluid agent is supplied through the communicating vessels 86a and 86b, the fluid agent thoroughly fills the elongate ejecting vents 84a and 84b and then pours out of the vents 84a and 84b down on the target area in the work piece till a predetermined height of a deposit stickily lies in shape of a pair of square brackets 90a and 90b. The fluid agent poured out of the first and second ejecting orifices 87 and 88 are deposited in shape of spots 91 and 92.

Embodiment 4

Figure 4A:
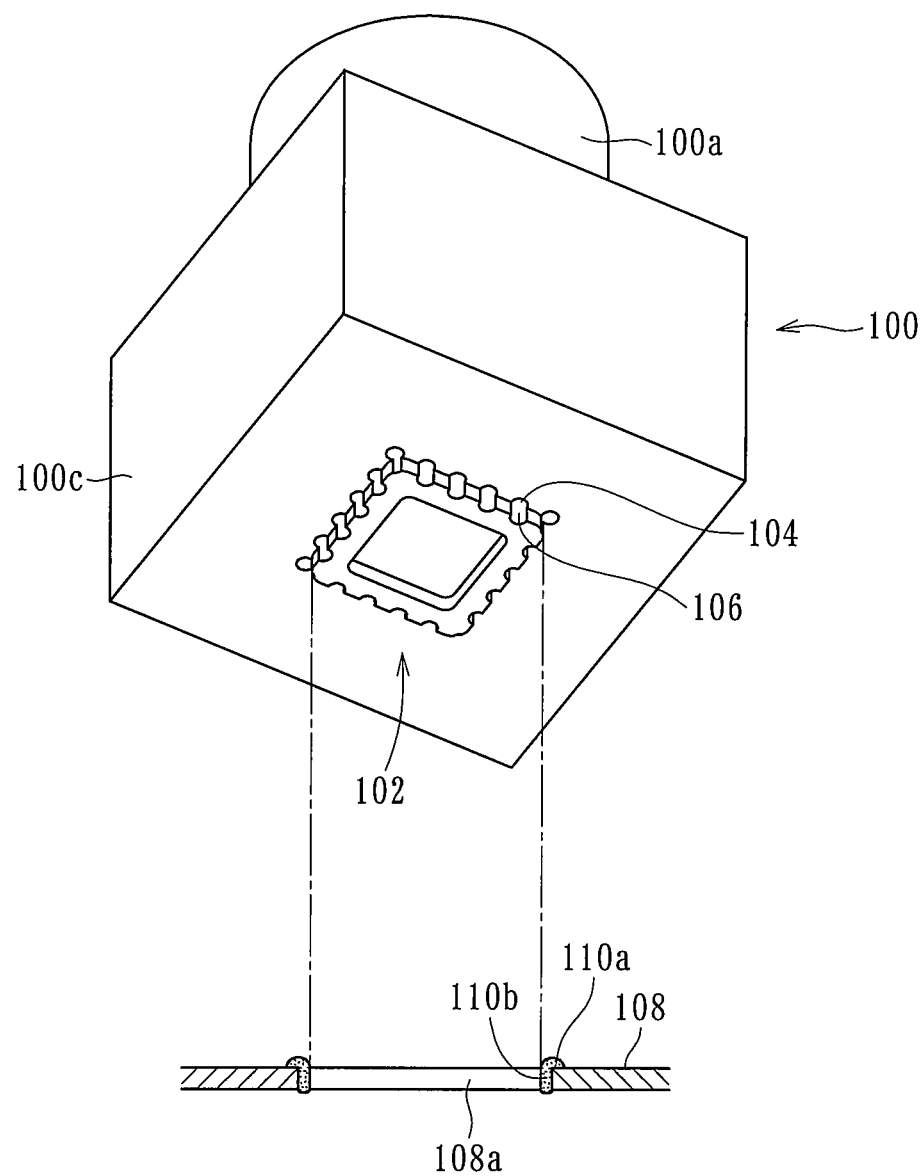
FIG. 4A is a perspective view illustrating a fourth embodiment of the multi-vent nozzle in accordance with the present invention.

FIG. 4A illustrates a fourth embodiment of the multi-vent nozzle denoted by a reference numeral 100. A casing block 100c and an inlet unit 100a are configured relative to each other in the same manner as their counterparts are in FIG. 1. In the center of a lower side of the casing block 100c of the multi-vent nozzle 100, a rectangular-ring-shaped raised portion 102 is formed. In the periphery of a proximal end of the raised portion 102, a plurality of ejection vents 104 leading to a hollow space within the casing block 100c are disposed equidistantly. The ejecting vents 104 may be formed by any of the well-known machining arts such as drilling, electrical discharging, laser emission, and the like. The ejecting vents 104 may have a width ranging from 0.03 to 0.1 mm. Outer side wall of the raised portion 102, which rises corresponding to a vertical extension of the raised portion 102, has grooves 106 with a semicircular cross-section vertically extending up to and in fluid communication with the ejecting vents 104.

The multi-vent nozzle 100 in FIG. 4A may also be used basically in the same manner as in FIG. 1. One exception is that the target area to apply the fluid agent to is in or around edges of holes or notches defined in the work piece. Specifically, as shown in FIG. 4A, the work piece, namely, a plate work piece 108 in this embodiment has an aperture 108a shaped similarly to but dimensioned slightly larger than the raised portion 102, and edges of the aperture 108a is a target area to apply the fluid agent to. A robot arm is operated to force the raised portion 102 of the multi-vent nozzle 100 to come down and fit in the aperture 108a so that the distal end surface of the casing block 100c is spaced apart from the plate work piece 108 by a predetermined distance while similarly there remains a predetermined clearance in the aperture 108a defined by the side wall of the raised portion 102. In such conditions, discharging a predetermined amount of the fluid agent from all the ejecting vents 104 permits the fluid agent to lie in a deposit 110a over the edges of the plate work piece and also permits the fluid agent to thoroughly fill the grooves 106 and spread into the clearance defined in the aperture 108a to leave a deposit 110b. Thus, in the fourth embodiment of the present invention, a single stroke or a single shot of the fluid agent achieves a three-dimensional application of the fluid agent.

Figure 4B:
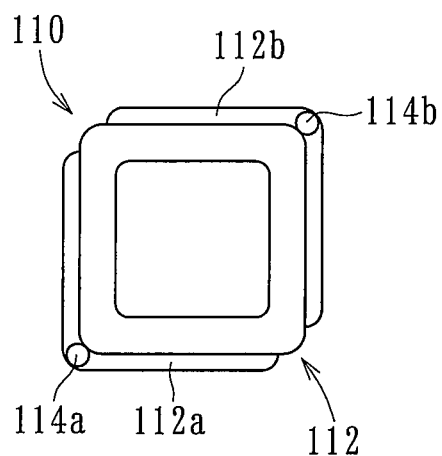
FIG. 4B is a bottom view of a varied version of the multi-vent nozzle in FIG. 4A.
Figure 4C:
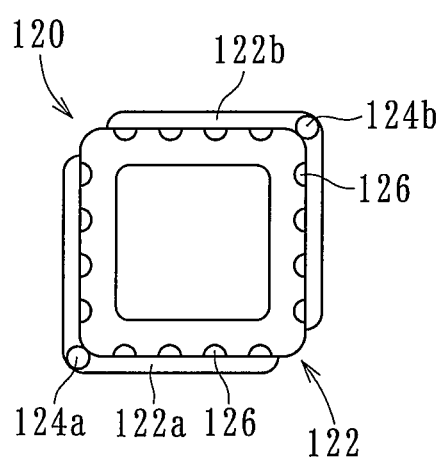
FIG. 4C is a bottom view of another variation of the multi-vent nozzle.

Alternatives to this embodiment include multi-vent nozzles 110 and 120 as shown in FIGS. 4B and 4C. The multi-vent nozzle 110 in FIG. 4B has a raised portion 112 and L-shaped elongate vents 112a and 112b defined along a proximal end of the raised portion. In the middle of the elongate vents 112a and 112b and around corners of the raised portion 112, communicating vessels 114a and 114b leading to a hollow space within the casing block are defined. An outer side wall that rises corresponding to a vertical extension of the raised portion 112 has no grooves like the grooves 106 depicted in FIG. 4A, and since the raised portion leaves a clearance appropriately in an aperture 108a of the work piece, the fluid agent discharged through the elongate vents 112a and 112b can spread uniformly in the clearance.

A multi-vent nozzle 120 in FIG. 4C has L-shaped elongate vents 122a and 122b extending along a proximal end of a raised portion 122. In the middle of the elongate vents 122a and 122b and around corners of the raised portion 122, communicating vessels 124a and 124b leading to a hollow space within the casing block are formed. An outer side wall, which rises corresponding to a vertical extension of the raised portion 122, has grooves 126 with a semicircular cross-section vertically extending up to and in fluid communication with the elongate vents 122a and 122b. In this embodiment, similar to that in FIG. 4A, the fluid agent can be laid in deposits 110a and 110b.

Figure 5:
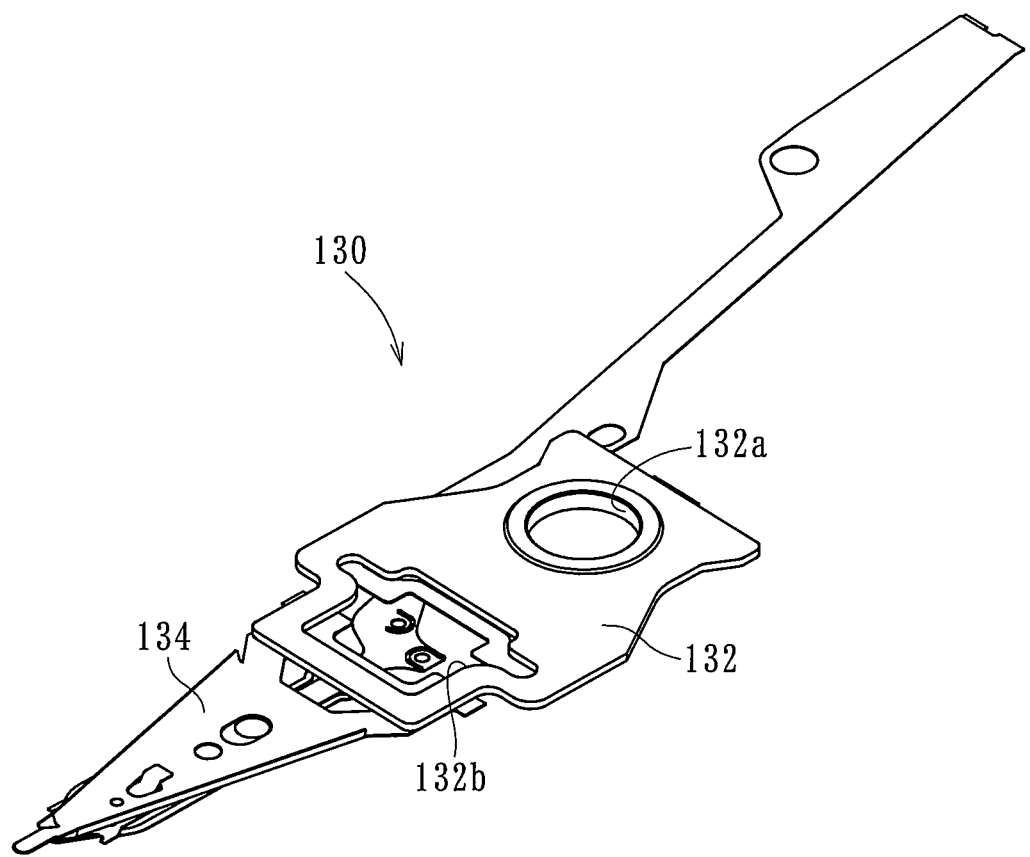
FIG. 5 is a perspective view illustrating a magnetic head suspension.

The multi-vent nozzle of the present invention and its applications will now be detailed. FIG. 5 illustrates a magnetic head suspension 130 comprised of a base plate 132 and a load beam 134. The base plate 132 has a hole 132a through which a support shaft such as a carriage arm is attached, and a hole 132b in which a micro-motion actuator (charge-coupled device) is fitted to force the load beam to pivot in the seek direction. The micro-motion actuator is adhesively fixed by the fluid agent deposited at front and rear edges around the hole 132b.

Figure 6:
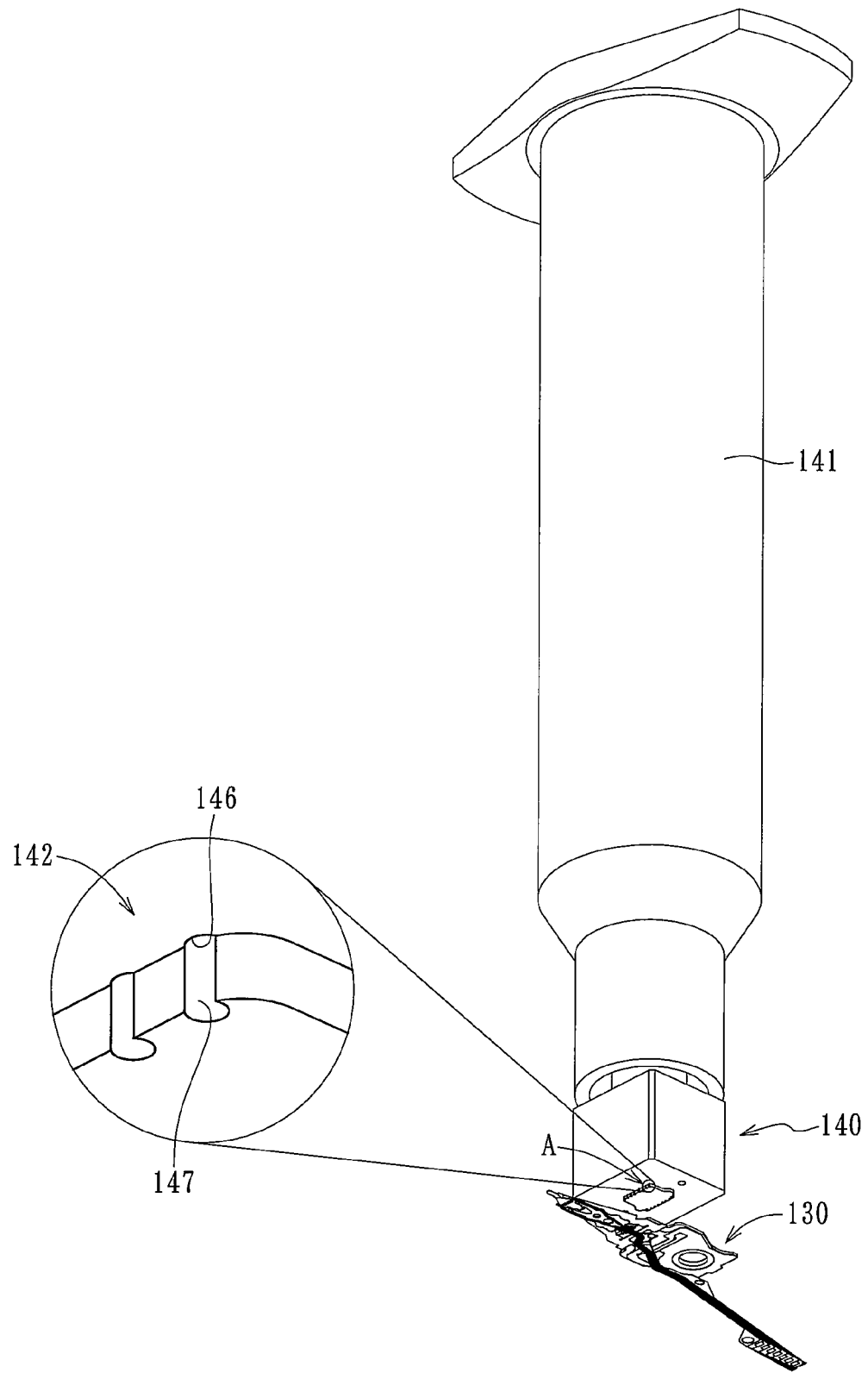
FIG. 6 is a perspective view illustrating a syringe, the multi-vent nozzle, and the magnetic head suspension.
Figure 7A:
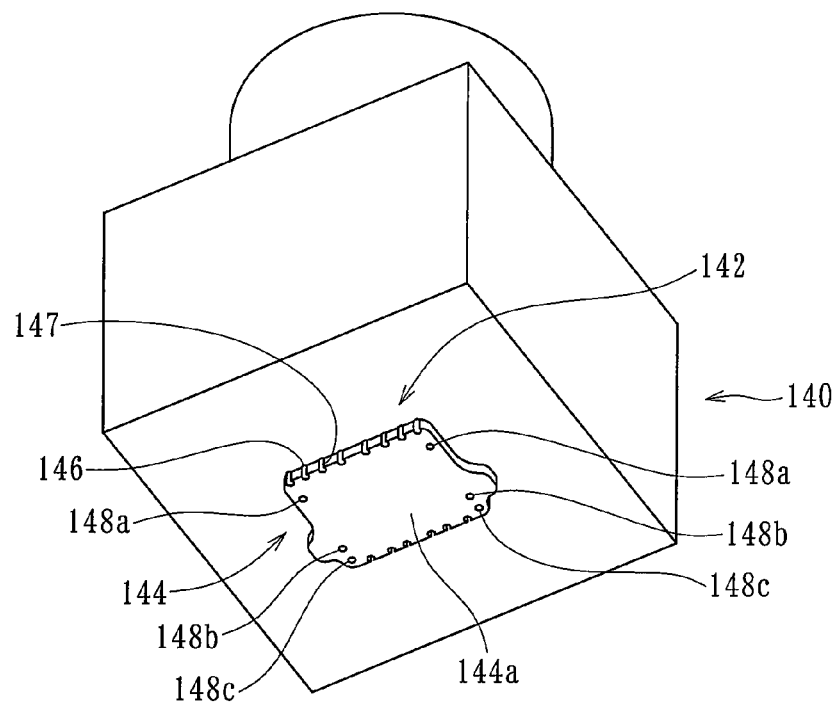
FIG. 7A is a perspective bottom view of a casing block.

FIG. 6 shows a syringe 141 and a casing block 140 attached thereto for applying the fluid agent to adhesively fix the micro-motion actuator. A distal end surface of the casing block 140 is provided with multi ejecting vents 142 similar to those shown in FIG. 4A. As will be recognized in detail in FIG. 7A, in the center of the distal end surface of the casing block 140, provided is a raised portion 144 which is contoured similar to the hole 132b and dimensioned slightly smaller than the hole 132b. A thickness (an extent of rising) of the raised portion 144 is almost the same as that of the base plate 132 or slightly greater. Along the front and rear side of the proximal end of the raised portion 144, a plurality of first ejecting vents 146 are defined. An outer wall, which rises corresponding to a vertical extension of the raised portion 144, has grooves 147 with semicircular cross-section vertically extending up to and in fluid communication with the first ejecting vents 146. In addition, in the distal end surface 144a on the bottom side of the raised portion 144, triplets of second ejecting vents 148a to 148c are aligned on the opposite lateral sides.

Figure 7B:
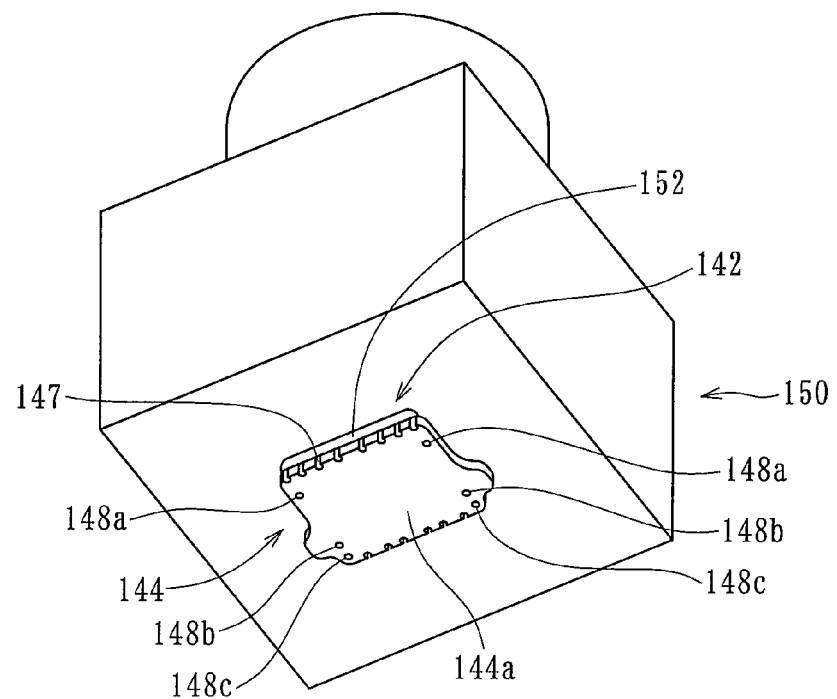
FIG. 7B is a perspective bottom view of a varied version of the casing block in FIG. 7A.

Alternative to this is a multi-vent nozzle 150 shown in FIG. 7B. The multi-vent nozzle 150 is unique in that the first ejecting vents 146 in the previous embodiment are replaced with elongate vents 152, and some of the elongate vents 152 have their respective ports in fluid communication with a hollow space within the casing block.

Figure 8A:
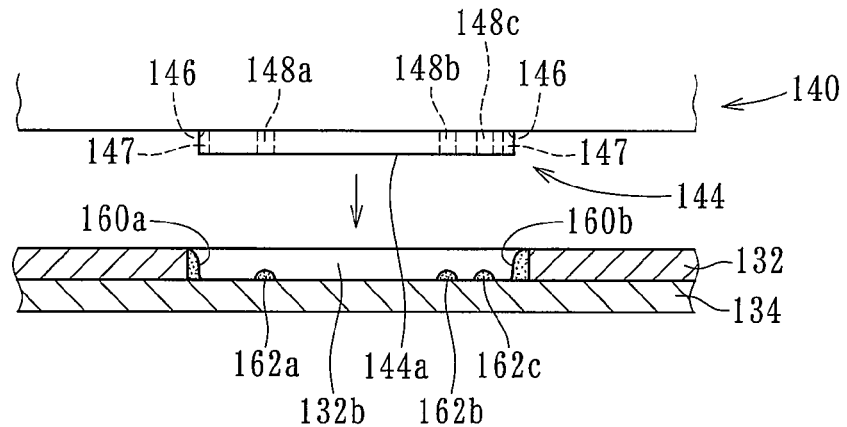
FIG. 8A is a side view of the multi-vent nozzle coming close to an assembly of a base plate and a load beam.
Figure 8B:
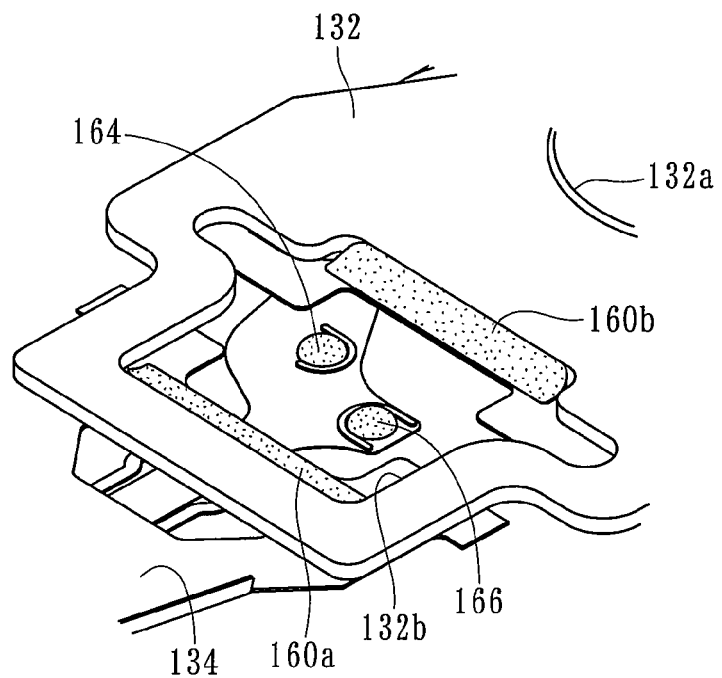
FIG. 8B is a perspective view showing fluid agent applied to the base plate of the magnetic head suspension.

The multi-vent nozzle 142 may be used in a manner described as follows. A robot arm is operated to move the casing block 140 to a position above the base plate 132, as shown in FIG. 8A, and while the raised portion 144 keeps its position right above the hole 132b, the casing block 140 is lowered. As the casing block 140 comes down and eventually causes the raised portion 144 to have its bottom surface or distal end surface 144a spaced from the upper side of the load beam 134 by a predetermined distance and to be in a face-to-face position parallel with each other, the robot arm stops. In such a state, the raised portion 144 is fitted in the hole 132 with a predetermined clearance, and another clearance is also left between the bottom surface of the casing block 140 and the upper surface of the base plate 132. In this condition, discharging the fluid agent (electrically insulating fluid agent) from all the first ejecting vents 146 permits the fluid agent poured in the grooves 147 of the raised portion 144 to spread uniformly in the clearance defined in the hole 132b, thereby leaving deposits 160a and 160b of the fluid agent in position, as shown in FIG. 8A. In addition, the fluid agent discharged from the second ejecting vents 148a to 148c defined in the raised portion 144a is deposited in shape of spots 162a to 162c. Deposits denoted by reference numerals 164 and 166 in FIG. 8B are electrically conductive fluid agent applied to the upper surface of the load beam by the prior art single-vent nozzle (the spots 162a to 162c as in FIG. 8A are omitted).

Figure 9:
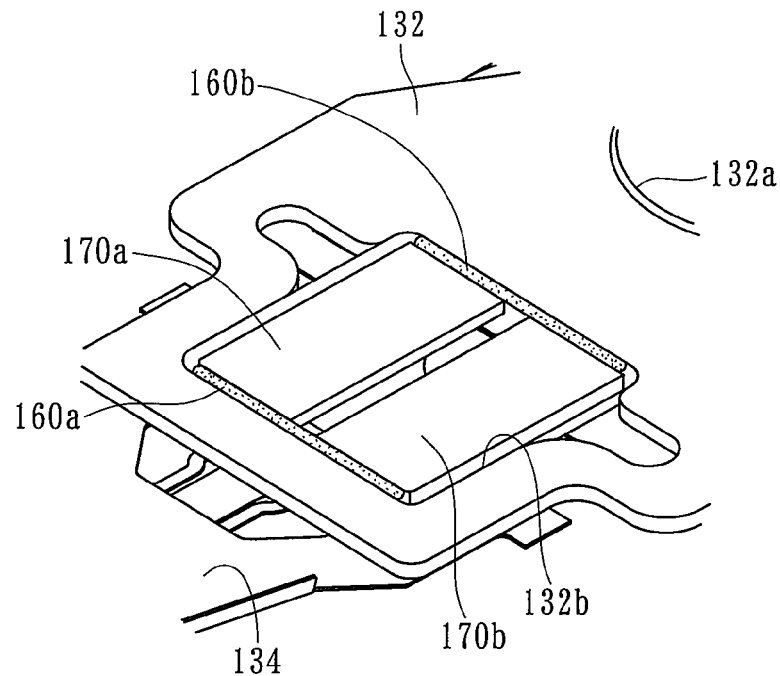
FIG. 9 is a perspective view of a micro-motion control actuator fitted in the base plate.
Figure 10:
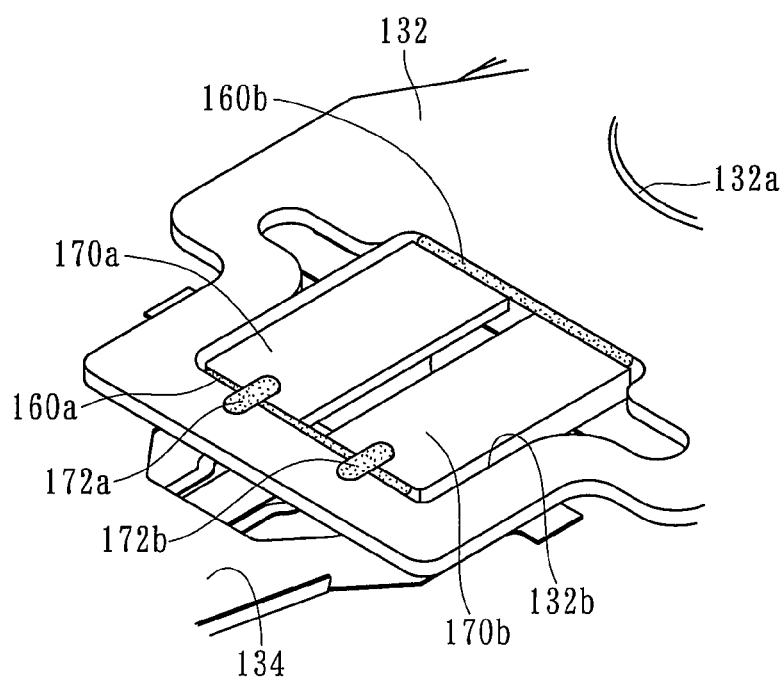
FIG. 10 is a perspective view of the micro-motion control actuator fitted in the base plate.
Figure 11A:
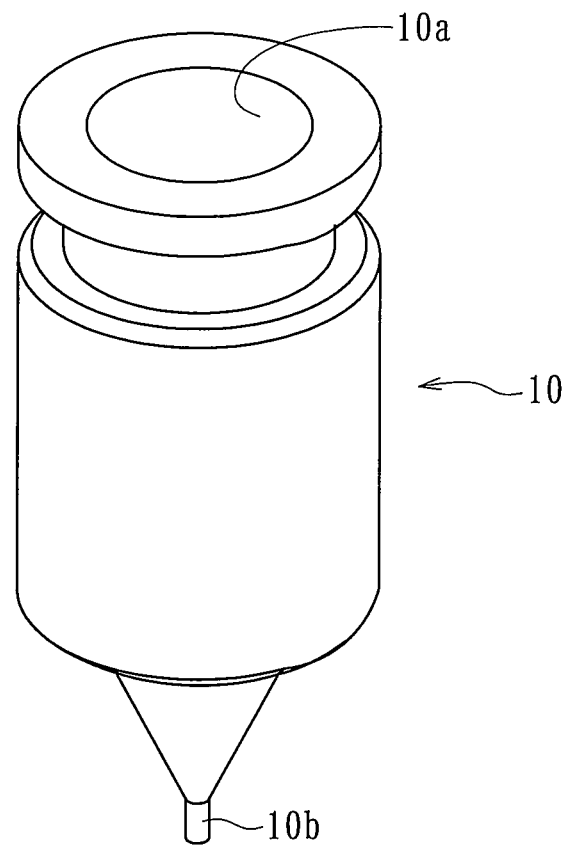
FIG. 11A is a perspective view of a prior art nozzle.
Figure 11B:
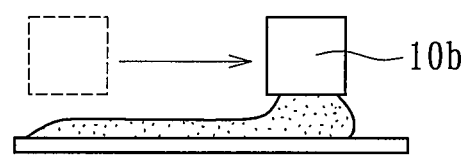
FIG. 11B is a side view of a line is drawn with the fluid agent discharged from the prior art nozzle.
Figure 12A:
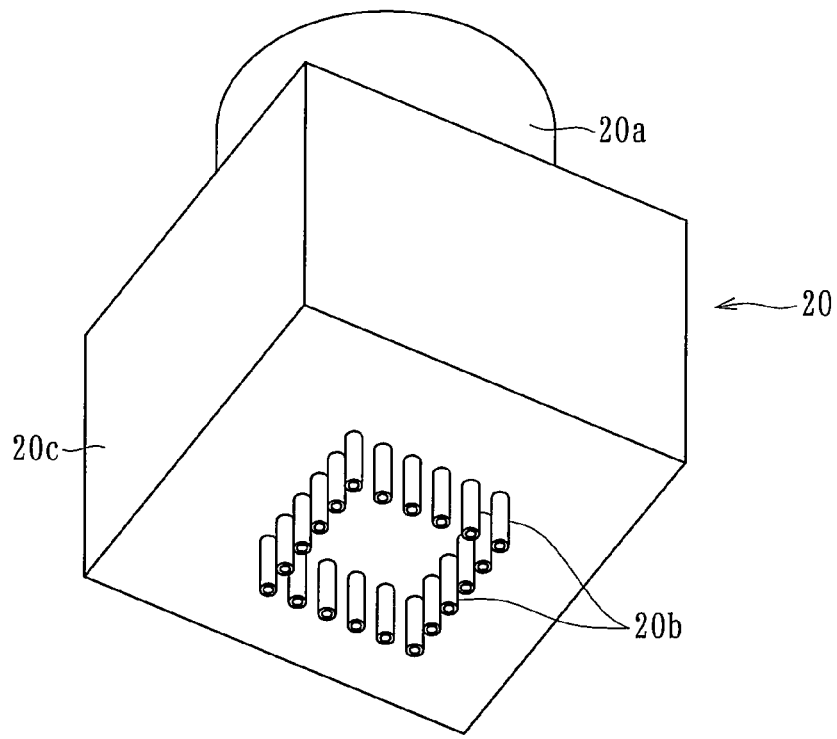
FIG. 12A is a perspective view of a prior art multi-vent nozzle.
Figure 12B:
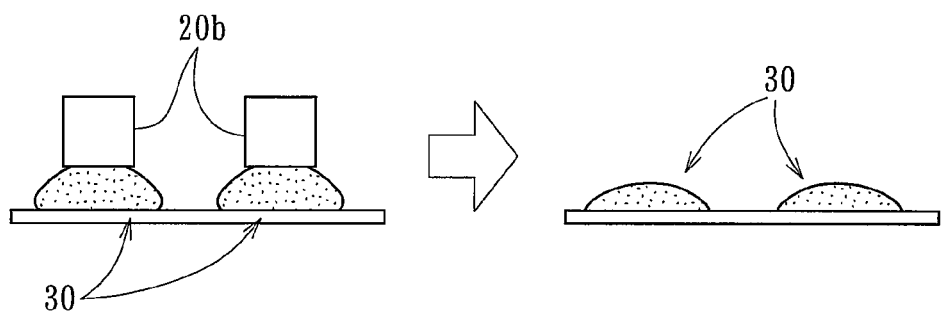
FIG. 12B is a side view of the prior art multi-vent nozzle applying the fluid agent.
Figure 12C:
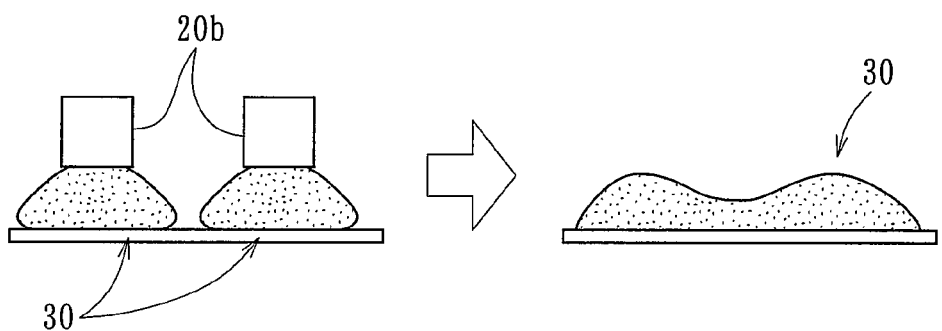
FIG. 12C is a side view of the prior art multi-vent nozzle applying the fluid agent.

Then, the robot arm is operated to raise the casing block 140, and instead, a pair of micro-motion actuators 170a and 170b shaped a rectangular thin plates are fitted in the hole 132b, as shown in FIG. 9. In this way, the micro-motion actuators 170a and 170b, bridging the hole 132b, have their respective front and rear ends fixed to the base plate 132 by the deposits 160a and 160b of the fluid agent, and the micro-motion actuators 170a and 170b have their respective lower major surfaces fixed to the upper surface of the load beam 134 by virtue of the spotted heaps 162a to 162c of the fluid agent and the deposits 164 and 166 of the electrically conductive fluid agent. Finally, as can be seen in FIG. 10, the prior art single-vent nozzle is used to apply the electrically conductive fluid agent 172a and 172b between the front ends of the upper major surface of the micro-motion actuators 170a and 170b and the base plate 132.

With the multi-vent nozzle 142 of the present invention used in the aforementioned manner, the deposits 160a and 160b over the edge portions of the hole 132b and the deposits 162a to 162c on the upper major surface of the load beam 134 can be applied at one time. In the prior art method, application to the base plate 132 and to the load beam is conducted in separate processes, but the multi-vent nozzle 142 of the present invention enables the fluid agent to be applied at a time to both the base plate 132 and the load beam 134.

The present invention is advantageous not only in view of saving time spent for applying the fluid agent but also in that the base plate 132 and the load beam 134 can have the fluid agent in significantly precise relative positions without errors. In other words, since the prior art method employs separate processes for applying the fluid agent to the base plate 132 and the load beam 134, respectively, and necessitates to transfer work pieces from one process to another, an error in positioning the work pieces thus transferred is likely to be a cause of a next error in applying the fluid agent in the desired relative positions on the work pieces, but the multi-vent nozzle 142 of the present invention, which is useful to omit the stage of transferring the work pieces between the separate fluid agent application processes, eliminates latency of such an error in positioning the work pieces, so that the relative positions of the fluid agent applied are determined in one steady way as prescribed in the specifications of the multi-vent nozzle 142.

Multi-vent nozzles for applying fluid agents according to the present invention are applicable to a wide range of industrial fields as well as the assembling process of components of a magnetic head suspension.

The invention claimed is:

1. A fluid agent applying multi-vent nozzle for applying fluid agent to an assembly of a base plate and a load beam of a magnetic head suspension for supporting a magnetic head, the multi-vent nozzle comprising:
   a main body configured in a casing block,
   a raised portion provided at a distal end of the casing block, and contoured and dimensioned corresponding to edge portions of a hole or a notch defined in the base plate, an actuator device for controlling the load beam being fitted in the hole or the notch, a plurality of first vents or elongate vents defined along a proximal end of the raised portion for supplying with fluid agent, second vents defined at the distal end of the casing block for applying the fluid agent to the load beam, and grooves in fluid communication with the plurality of the first vents or the elongate vents and extending along a rising extension of the raised portion.

2. A multi-vent nozzle for applying fluid agent to an assembly of a base plate and a load beam for a magnetic head suspension for supporting a magnetic head, the multi-vent nozzle comprising:

a main body comprising a casing block, said casing block having a hollow space therein and a distal end surface;

a raised portion that extends from said distal end surface of said casing block, said raised portion having a contour and edge portions, said edge portions extending from a proximal end of said raised portion at said distal end surface of said casing block to a distal end surface of said raised portion that is spaced from said distal end surface of said casing block, wherein said raised portion is contoured and dimensioned so as to correspond to edge portions of a space defined in the base plate for receiving an actuator device used for controlling the load beam;

a plurality of first vents communicating said hollow space of said casing block with said distal end surface of said casing block for supplying fluid agent, said plurality of first vents being located at said proximal end of said raised portion along and adjacent to said edge portions thereof and outside of an area of said raised portion on said distal end surface of said casing block;

a plurality of second vents communicating said hollow space of said casing block with said distal end surface of said raised portion; and grooves that are in said edge portions of said raised portion and that are in fluid communication with said plurality of first vents, said grooves extending from said proximal end of said raised portion to said distal end of said raised portion.

3. The multi-vent nozzle of claim 2, wherein said distal end surface of said casing block is planar.

4. The multi-vent nozzle of claim 3, wherein said distal end surface of said raised portion is planar.

5. A multi-vent nozzle for applying fluid agent to an assembly of a base plate and a load beam for a magnetic head suspension for supporting a magnetic head, the multi-vent nozzle comprising:

a main body comprising a casing block, said casing block having a hollow space therein and a distal end surface;

a raised portion that extends from said distal end surface of said casing block, said raised portion having a contour and edge portions, said edge portions extending from a proximal end of said raised portion at said distal end surface of said casing block to a distal end surface of said raised portion that is spaced from said distal end surface of said casing block, wherein said raised portion is contoured and dimensioned so as to correspond to edge portions of a space defined in the base plate for receiving an actuator device used for controlling the load beam;

a plurality of first vents communicating said hollow space of said casing block with said distal end surface of said casing block for supplying fluid agent, said plurality of first vents being located at said proximal end of said raised portion along and adjacent to said edge portions thereof and outside of an area of said raised portion on said distal end surface of said casing block;

a plurality of second vents communicating said hollow space of said casing block with said distal end surface of said raised portion; and grooves that are in said edge portions of said raised portion and that are in fluid communication with said plurality of first vents, said grooves extending from said proximal end of said raised portion to said distal end of said raised portion;

wherein said plurality of first vents comprise elongate vents that extend along said edge portions of said raised portion.

* * * * *